United States Patent
Tighe et al.

(10) Patent No.: US 7,069,432 B1
(45) Date of Patent: Jun. 27, 2006

(54) SYSTEM AND METHOD FOR PROVIDING SECURITY IN A TELECOMMUNICATION NETWORK

(75) Inventors: James R. Tighe, Frisco, TX (US); Ronald D. Higgins, The Colony, TX (US); Richard B. Platt, Allen, TX (US); Robert T. Bell, Bountiful, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,193

(22) Filed: Jan. 4, 2000

(51) Int. Cl.
*H04L 9/00* (2006.01)
*H04M 1/82* (2006.01)
*H04M 1/677* (2006.01)

(52) U.S. Cl. .................. 713/151; 713/152; 713/168; 713/169; 379/229; 379/231; 379/265

(58) Field of Classification Search ................ 713/201, 713/151; 709/218, 227, 231, 232; 379/229, 379/87, 95
See application file for complete search history.

(56) References Cited

U.S. PATENT DOCUMENTS

| | | | |
|---|---|---|---|
| 4,631,534 A | 12/1986 | Franklin et al. ......... 340/825.5 |
| 5,033,079 A | 7/1991 | Catron et al. ............. 379/100 |
| 5,058,110 A | 10/1991 | Beach et al. ............. 370/85.6 |
| 5,093,827 A | 3/1992 | Franklin et al. .......... 370/60.1 |
| 5,375,167 A | 12/1994 | Bales et al. .............. 379/207 |
| 5,420,852 A | 5/1995 | Anderson et al. ......... 370/58.1 |
| 5,455,855 A * | 10/1995 | Hokari ...................... 379/229 |
| 5,471,318 A | 11/1995 | Ahuja et al. .............. 358/400 |
| 5,559,883 A | 9/1996 | Williams ...................... 380/4 |
| 5,583,863 A * | 12/1996 | Darr et al. ................. 370/397 |
| 5,610,910 A | 3/1997 | Focsaneanu et al. ....... 370/351 |
| 5,623,488 A | 4/1997 | Svennevik et al. ........ 370/360 |
| 5,623,601 A | 4/1997 | Vu ......................... 395/187.01 |
| 5,636,371 A | 6/1997 | Yu .............................. 395/500 |
| 5,640,446 A | 6/1997 | Everett et al. .............. 379/115 |
| 5,642,407 A * | 6/1997 | He ............................... 379/87 |
| 5,692,039 A | 11/1997 | Brankley et al. ........... 379/229 |
| 5,710,591 A | 1/1998 | Bruno et al. ................. 348/15 |
| 5,748,736 A | 5/1998 | Mittra ......................... 380/21 |
| 5,778,174 A | 7/1998 | Cain ...................... 395/187.01 |
| 5,781,550 A | 7/1998 | Templin et al. ............ 370/401 |
| 5,802,058 A | 9/1998 | Harris et al. ............... 370/410 |
| 5,803,199 A | 9/1998 | Walter ........................ 180/120 |
| 5,805,803 A | 9/1998 | Birrell et al. .......... 395/187.01 |

(Continued)

FOREIGN PATENT DOCUMENTS

EP 841831 A2 * 5/1998

(Continued)

OTHER PUBLICATIONS

Cisco Systems, Inc.; "System Description for the Cisco Communications Network Version 2.1;" Cisco Communications Network; all, 1997.

(Continued)

*Primary Examiner*—Ayaz Sheikh
*Assistant Examiner*—Carl G. Colin
(74) *Attorney, Agent, or Firm*—Baker Botts L.L.P.

(57) ABSTRACT

A method is provided for establishing a telephone call between a trusted Internet Protocol (IP) telephone and an untrusted device. The method includes receiving a call initiation request from the untrusted device that indicates a desired communication with the trusted IP telephone. The method evaluates the call initiation request, and establishes a telecommunication link between the untrusted device and the trusted IP telephone in response to a positive evaluation of the call initiation request.

43 Claims, 2 Drawing Sheets

U.S. PATENT DOCUMENTS

| | | | |
|---|---|---|---|
| 5,826,014 A | 10/1998 | Coley et al. | 395/187.01 |
| 5,835,718 A | 11/1998 | Blewett | 395/200.48 |
| 5,857,191 A | 1/1999 | Blackwell, Jr. et al. | 707/10 |
| 5,867,494 A | 2/1999 | Krishnaswamy et al. | 370/352 |
| 5,867,495 A | 2/1999 | Elliott et al. | 370/352 |
| 5,872,779 A | 2/1999 | Vaudreuil | 370/352 |
| 5,884,025 A | 3/1999 | Baehr et al. | 395/187.01 |
| 5,896,379 A | 4/1999 | Haber | 370/390 |
| 5,940,479 A | 8/1999 | Guy et al. | 379/93.01 |
| 5,983,005 A | 11/1999 | Monteiro et al. | 395/200.61 |
| 6,006,272 A | 12/1999 | Aravamudan et al. | 709/245 |
| 6,018,766 A | 1/2000 | Samuel et al. | 709/218 |
| 6,020,915 A * | 2/2000 | Bruno et al. | 348/14.09 |
| 6,138,144 A | 10/2000 | DeSimone et al. | 709/204 |
| 6,151,679 A | 11/2000 | Friedman et al. | 713/201 |
| 6,154,839 A | 11/2000 | Arrow et al. | 713/154 |
| 6,163,810 A | 12/2000 | Bhagavath et al. | 709/238 |
| 6,173,314 B1 | 1/2001 | Kurashima et al. | 709/204 |
| 6,175,618 B1 | 1/2001 | Shah et al. | 379/201 |
| 6,175,867 B1 | 1/2001 | Taghadoss | 709/223 |
| 6,181,697 B1 | 1/2001 | Nurenberg et al. | 370/390 |
| 6,212,550 B1 | 4/2001 | Segur | 709/206 |
| 6,226,373 B1 | 5/2001 | Zhu et al. | 379/207 |
| 6,259,701 B1 | 7/2001 | Shur et al. | 370/401 |
| 6,321,336 B1 | 11/2001 | Applegate et al. | 713/201 |
| 6,360,265 B1 | 3/2002 | Falck et al. | 709/227 |
| 6,363,411 B1 * | 3/2002 | Dugan et al. | 709/202 |
| 6,363,424 B1 | 3/2002 | Douglas et al. | 709/224 |
| 6,374,298 B1 | 4/2002 | Tanno | 709/227 |
| 6,385,193 B1 | 5/2002 | Civanlar et al. | 370/352 |
| 6,389,130 B1 | 5/2002 | Shenoda et al. | 379/221.08 |
| 6,389,462 B1 * | 5/2002 | Cohen et al. | 709/218 |
| 6,404,745 B1 | 6/2002 | O'Neil et al. | 370/260 |
| 6,404,746 B1 | 6/2002 | Cave et al. | 370/262 |
| 6,404,764 B1 | 6/2002 | Jones et al. | 370/352 |
| 6,418,138 B1 | 7/2002 | Cerf et al. | 370/352 |
| 6,421,437 B1 | 7/2002 | Slutsman | 379/201.02 |
| 6,430,176 B1 | 8/2002 | Christie, IV | 370/355 |
| 6,446,127 B1 | 9/2002 | Schuster et al. | 709/227 |
| 6,449,269 B1 | 9/2002 | Edholm | 370/352 |
| 6,477,169 B1 | 11/2002 | Angle et al. | 370/395.42 |
| 6,480,594 B1 | 11/2002 | Van Tol | 379/221.02 |
| 6,487,196 B1 * | 11/2002 | Verthein et al. | 370/352 |
| 6,512,818 B1 | 1/2003 | Donovan et al. | 379/88.18 |
| 6,529,514 B1 | 3/2003 | Christie et al. | 370/401 |
| 6,564,261 B1 * | 5/2003 | Gudjonsson et al. | 709/227 |
| 6,567,851 B1 | 5/2003 | Kobayashi | 709/228 |
| 6,584,562 B1 * | 6/2003 | Fiori | 713/151 |
| 6,594,699 B1 * | 7/2003 | Sahai et al. | 709/228 |
| 6,603,849 B1 | 8/2003 | Lin et al. | 379/221.01 |
| 6,608,825 B1 | 8/2003 | Luddy | 370/342 |
| 6,614,784 B1 | 9/2003 | Glitho et al. | 370/352 |

FOREIGN PATENT DOCUMENTS

WO     WO 9811704 A2 *    3/1998

OTHER PUBLICATIONS

Cisco Systems, Inc., "System Description for the Cisco Communications Network Version 2.1;" Cisco Communications Network, cover sheet and pp. 1-35, Jan. 1999.

* cited by examiner

SYSTEM AND METHOD FOR PROVIDING SECURITY IN A TELECOMMUNICATION NETWORK

CROSS-REFERENCE TO RELATED APPLICATIONS

This application is filed concurrently with the following commonly-owned applications: SYSTEM AND METHOD FOR MAINTAINING A COMMUNICATION LINK, Ser. No. 09/477,192 SYSTEM AND METHOD FOR ENABLING MULTICAST TELECOMMUNICATIONS, Ser. No. 09/477,298 and SYSTEM AND METHOD FOR A VIRTUAL TELEPHONY INTERMEDIARY, Ser. No. 09/477,297.

TECHNICAL FIELD OF THE INVENTION

This invention relates generally to the field of telecommunications, and more specifically to a system and method for providing security in a telecommunication network.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP).

Since many LANs and WANs transmit computer data using Internet Protocol (IP), VoIP uses this existing technology to transmit voice and fax signals by converting these signals into digital data and encapsulating the data for transmission over an IP network. Furthermore, by using existing "long distance" computer networks, such as private (or leased) WANs or the Internet, telephone calls can be made to distant locations using VoIP without incurring long distance telephone charges. For example, an employee of a company in Dallas can call a co-worker who is based in San Jose using the company's existing WAN. However, if these long distance communications are made over untrusted networks, or if calls are received from untrusted locations, security problems arise. These security issues exist when using VoIP since the IP telephones are connected to the same networks as computers containing sensitive information.

SUMMARY OF THE INVENTION

In accordance with the present invention, a system and method for providing security in a telecommunication network are provided that substantially eliminate or reduce disadvantages or problems associated with previously developed systems and methods. In particular, the present invention contemplates an authentication controller capable of evaluating incoming telecommunications, and a telephony proxy capable of serving as an intermediary to enable a telephone call between a trusted telephone and an untrusted device.

In one embodiment of the present invention, a method is provided for establishing a telephone call between a trusted Internet Protocol (IP) telephone and an untrusted device. The method includes receiving a call initiation request from the untrusted device that indicates a desired communication with the trusted IP telephone. The method evaluates the call initiation request, and establishes a telecommunication link between the untrusted device and the trusted telephone in response to a positive evaluation of the call initiation request.

In another embodiment of the present invention, a communication network is provided for establishing a telephone call between a trusted telephone and an untrusted device. The communication network includes a first trusted network and a trusted telephone coupled to the first trusted network. The communication network also includes an authentication controller coupled to the first trusted network and operable to evaluate a call initiation request received from an untrusted device external to the first trusted network. The call initiation request indicates a desired communication with the trusted telephone. The network further includes a call manager operable to initiate the creation of a telecommunication link between the trusted telephone and the untrusted device in response to a positive evaluation of the call initiation request.

Technical advantages of the present invention include a system and method for providing security in a telecommunication network. The present invention allows telecommunications between a trusted telephone coupled to a protected network and an untrusted device external to the protected network to occur while still maintaining network security. The present invention can be used to evaluate incoming telecommunications based on a number of factors, including, but not limited to, the source and/or destination of the telecommunications, the transmission format of the telecommunications, and the compression format of the telecommunications.

The present invention may also provide a telephony proxy that serves as an intermediary between the trusted telephone and the untrusted device. The telephony proxy can be implemented in various forms, such as software or embedded firmware for incorporation into hardware such as routers and firewalls. The telephony proxy may also be used to manipulate the media streaming between the trusted telephone and the untrusted device as required to maintain the integrity of the protected network. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
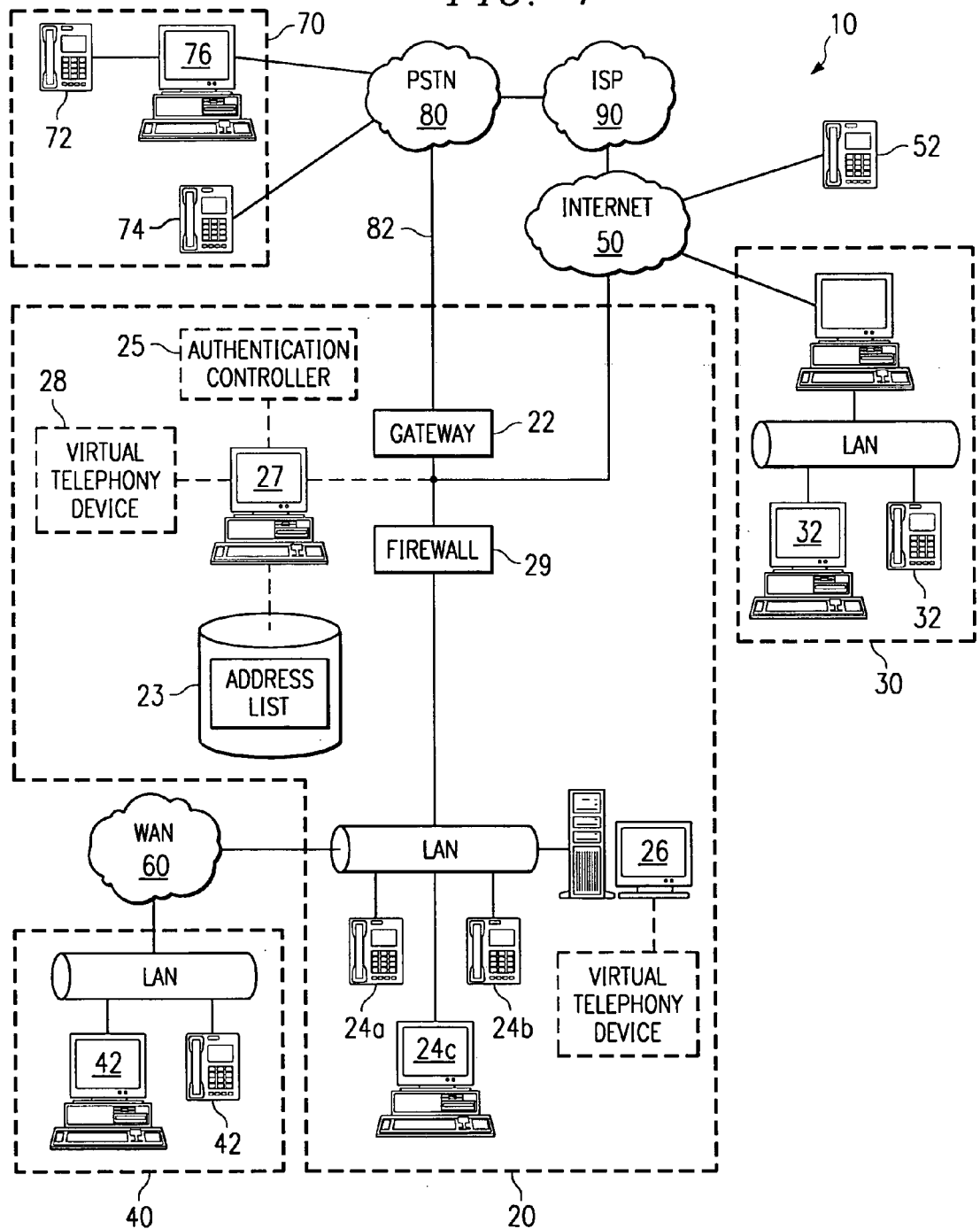
FIG. 1 illustrates an exemplary communication network in accordance with the present invention.

FIG. 1 illustrates an exemplary communication network 10. In the illustrated embodiment, communication network 10 includes a plurality of local area networks (LANs) 20, 30, 40 that are interconnected using various techniques, including the Internet 50 and a wide area network (WAN) 60. Each LAN is a computer data network that is further operable to transmit audio and/or video telecommunication signals. Communication network 10 also includes a remote communication site 70 coupled to one or more of LANs 20, 30, 40 using the Public Switched Telephone Network (PSTN) 80. Although a specific communication network is illustrated in FIG. 1, the term "communication network" should be interpreted as generically defining any network or combination of networks capable of transmitting telecommunication signals, data, and/or messages.

In a particular embodiment, LANs 20, 30, 40 are Ethernet networks that transmit data using the Internet Protocol (IP). However, LANs 20, 30, 40 may be any type of network that allows the transmission of audio and/or video telecommunication data, as well as traditional computer data. Therefore, although subsequent description will be primarily focused on IP networks, it should be understood that other appropriate networks including, but not limited to, Frame Relay networks, Asynchronous Transfer Mode networks, and Token Ring networks are also included within the scope of this description.

As mentioned above, LANs 20, 30, 40 are coupled to each other using other IP networks. For example, LAN 20 is coupled to LAN 30 using Internet 50, which is a public IP network. Similarly, LAN 20 is coupled to LAN 40 though WAN 60, which is typically a semi-private IP network (such as a set of communications lines owned by a telecommunication company and leased to various businesses). Remote site 70 may be coupled with LANs 20, 30, 40 using Internet 50 and/or PSTN 80. Remote site 70 may be directly connected to Internet 50, or it may use PSTN 80 to send data to and receive data from Internet 50 using an Internet Service Provider (ISP) 90. Furthermore, remote site 70 may be coupled to a LAN, such as LAN 20, using only PSTN 80. In this case, a gateway 22 facilitates communications between telephony devices at remote site 70 and LAN 20 by converting between the different data transmission formats (e.g., audio compression and encoding formats) utilized by LAN 20 and PSTN 80.

IP networks transmit data (including voice and video data) by placing the data in packets and sending each packet to the selected destination. Unlike a circuit-switched network (e.g., PSTN 80), dedicated bandwidth is not required for the duration of a call or fax transmission over LANs 20, 30, 40, Internet 50 or WAN 60. Instead, each network device sends packets across the network as they become available for transmission. This feature makes bandwidth available for other transmissions when voice or fax data is not being transmitted.

IP telephony devices, such as an IP telephone, can be coupled to any of these IP networks and used for communication between users of the networks. Furthermore, since all IP networks share a common method of transmitting data, telecommunication signals may be transmitted between telephony devices that are located on different, but interconnected, IP networks. The technology that allows telecommunications to be transmitted over an IP network may be referred to as Voice over IP (VoIP). As an example, IP telephony devices 24 are coupled to LAN 20 to allow communication over LAN 20. IP telephony devices 24 have the capability of encapsulating a user's voice (or other inputs, such as the user's image) into IP packets so that the voice can be transmitted over LANs 20, 30, 40, Internet 50, WAN 60, and/or PSTN 80. IP telephony devices may include telephones, fax machines, computers running telephony software (such as MICROSOFT NETMEETING), gateways, or any other device capable of performing telephony functions over an IP network. For the purposes of this application, all types of telephony devices (both IP and non-IP) will be referred to as "telephones."

One example of an IP telephone is an IP Ethernet telephone that plugs directly into an Ethernet RJ-45 jack, as opposed to a traditional RJ-11 telephone jack. Alternatively, a user may plug a handset or headset directly into a personal computer on an IP network to form a virtual IP telephone. An IP telephone typically resembles a traditional digital PBX telephone, but instead of connecting to a proprietary PBX port, the telephone has an IP port, such as an Ethernet port. An IP telephone operates as a standard IP network device and typically has its own IP address (IP telephones may also have more than one IP address). IP telephones may also have the ability to handle data coding and decoding at the telephone. This feature allows the telephone to switch compression schemes on demand, such as switching between G.711 and G.723 compression.

A call manager 26 controls IP telephones 24 on LAN 20. Call manager 26 is an application that controls call processing, routing, telephone features and options (such as call hold, call transfer and caller ID), device configuration, and other telephony functions and parameters within communication network 10. Call manager 26 can control all of the IP telephones 24 on LAN 20, and it may also control IP telephones on other IP networks. For example, call manager 26 is capable of controlling IP telephones 32 on LAN 30 and IP telephones 42 on LAN 40.

When a user wishes to place a call from an IP telephone 24a on LAN 20 to another IP telephone 24b on LAN 20 (an intra-LAN call), the calling telephone transmits a signal to call manager 26 indicating the desired function and the telephone to be called. Call manager 26 then checks on the availability of the called telephone and, if available, establishes the call by instructing the calling (originating) telephone to begin audio and/or video (media) streaming to the called (destination) telephone. The initial signaling between call manager 26 and either the originating telephone or the destination telephone is transmitted over LAN 20 using the Transmission Control Protocol (TCP). The TCP network layer in the transmitting telephone divides the data to be transmitted into one or more packets, numbers the packets, and then forwards them to the IP network layer for transmission to the destination telephone. Although each packet has the same destination IP address, the packets may travel along different paths to reach the intended destination. As the packets reach the destination telephone, the TCP layer of the destination telephone reassembles the individual packets and ensures that they all have arrived. Once TCP reassembles the data, it forwards the data to the destination telephone as a single message.

After call manager 26 initiates the call with signaling via TCP, audio streaming between the telephones begins. A codec (coder/decoder) converts the voice, video or fax signals generated by the users of the telephones from analog voice signals into digital form. The codec may be implemented either in software or as special-purpose hardware in IP telephones 24. In the case of an IP telephone, as the user speaks into the handset, the codec converts the analog voice signals into digital data. The digitally encoded data is then encapsulated into IP packets so that it can be transmitted over LAN 20.

The encapsulation of audio and video streams between IP telephones 24 may be performed using Real-Time Transport Protocol (RTP) running over User Datagram Protocol (UDP), or any other suitable communication protocol. As with TCP, UDP uses the Internet Protocol to get data packets from one computer to another. Unlike TCP, however, UDP does not provide sequencing and error-checking of the arriving packets. However, since UDP does not perform these functions, UDP operates faster than TCP and is useful when speed is more important than accuracy. This is true of audio and video streaming since it is critical that the data be transmitted as quickly as possible, but it is not critical that every single packet is reassembled correctly (either its absence is negligible or its content can be extrapolated by the destination telephone).

Once the UDP network layer has received and reassembled the IP packets at the destination telephone, a codec in the destination telephone translates the digital data into analog audio and/or video signals for presentation to the user. The codec may be implemented either in software or as special-purpose hardware in IP telephones 24. The entire process is repeated each time that any call participant (or any other source) generates an audio, video, or fax signal.

In addition to intra-LAN telephone calls, calls can also be placed to and received from non-IP telephones that are connected to PSTN 80, such as telephone 74 located at remote site 70. Such calls are made through gateway 22. Gateway 22 converts analog or digital circuit-switched data transmitted by PSTN 80 to packetized data transmitted by LAN 20, and vice-versa. When voice data packets are transmitted from LAN 20 to remote site 70 over PSTN 80, gateway 22 retrieves the data contained in the packets coming from LAN 20 and converts this digital data to the analog or digital format used by the PSTN trunk 82 to which gateway 22 is coupled. Since the digital format used for voice transmissions over an IP network is often different than the format used on the digital trunks of PSTN 80, the gateway provides conversion between these different digital formats, referred to as transcoding. Gateway 22 also translates between the VoIP call control system and the Signaling System 7 (SS7) protocol or other signaling protocols used in PSTN 80.

For voice transmissions from remote site 70 back to LAN 20 over PSTN 80, the process is reversed. Gateway 22 takes the incoming voice transmission (in either analog or digital form) and converts it into the digital format used by LAN 20. The digital data is then encapsulated into IP packets and transmitted over LAN 20. This process is continued between PSTN 80 and LAN 20 through gateway 22 until the call is complete.

Remote site 70 may also include an IP telephone 72. A call may be placed between telephone 72 and another IP telephone 24 on LAN 20 using Internet 50 and ISP 90. Telephone 72 is connected to a computer 76 that is coupled to ISP 90 using a modem. IP-encapsulated audio and/or video data packets are sent from telephone 72 to computer 76. Computer 76 then uses the modem to transmit the data over PSTN to ISP 90, where the data is transmitted to Internet 50 (alternatively, computer 76 may be directly connected to Internet 50). The data is finally transmitted over Internet 50 to LAN 20, where it is received by telephone 24. Note that no gateway 22 is required, since the communication is between two IP telephones (even though the telephones are not directly connected).

Calls can also be made between an IP telephone located on LAN 20 and an IP telephone located on another LAN 30, 40, on Internet 50, or on WAN 60. For example, a call may be placed between IP telephone 24 connected to LAN 20 and IP telephone 42 connected to LAN 40. As discussed above, the analog voice or fax data is digitized and encapsulated into IP packets at the originating IP telephone 24. A router (or other similar device) then directs the packets over WAN 60 to the IP address of the destination IP telephone 42. IP telephone 42 then retrieves the data and coverts it to analog form for presentation to the user. IP telephone 42 may be controlled by the same call manager 26 as IP telephone 24, or it may be controlled by a call manager on LAN 30 or LAN 40.

In any of the above scenarios, when a call is placed to an IP telephone, for example IP telephone 24, a call initiation request is first sent to call manager 26. If the originating telephone is an IP telephone (e.g., a telephone on LAN 30, LAN 40, Internet 50, or WAN 60), the originating IP telephone generates the call initiation request and sends the request to call manager 26. If the originating telephone is a non-IP telephone, such as telephone 74, gateway 22 first intercepts the incoming call from PSTN 80, and then sends a call initiation request to call manager 26 indicating the IP telephone that is being called. In either case, once call manager 26 receives the call initiation request, call manager 26 sends a signal to the destination IP telephone offering the call to the telephone.

If the destination telephone, for example, IP telephone 24, can accept the call (e.g., it is not in use or under a Do Not Disturb instruction from the user), IP telephone 24 replies to call manager 26 that it will accept. Upon receiving this acceptance, call manager 26 transmits a signal to IP telephone 24 to cause it to ring. The telephone's user can then hear the ring and can take the telephone "off-hook" to receive the call. Taking the telephone off-hook may include, but is not limited to, picking up a handset, pressing the ringing line's button, pressing a speakerphone button, or otherwise indicating that the telephone is ready to receive the incoming call. For the purposes of this application, the term "off-hook" is used to generically indicate a condition of a telephone when it is ready to initiate or receive telecommunication signals. Once IP telephone 24 has been taken off-hook, call manager 26 establishes media streaming (such as RTP media streaming) between IP telephone 24 and the originating telephone. If the originating telephone is a non-IP telephone, such as telephone 74, the media streaming occurs between IP telephone 24 and gateway 22. Gateway 22 then transmits the audio and/or video data to telephone 74.

One advantage associated with IP telephones is their ability to communicate and interact with any other IP device coupled to the IP network. For example, IP telephones may interact and communicate with other IP telephones, with non-telephony IP devices, and even with virtual telephony devices. A virtual telephony device may be implemented as software, firmware and/or hardware to interact with devices in communication network 10. Virtual telephony devices may be implemented as software or firmware on any existing or dedicated device on the IP network. For example, computer 27 contains software for implementing one or more virtual telephony devices 28. Virtual telephony device software may also be located at call manager 26, or any other network device. The computer or other device on which the virtual telephony software is located includes a network interface, a memory to store the software, and a processor to execute the software.

Virtual telephony devices 28 may be logically inserted between two or more telephones to act as an intermediary between the two telephones. Once such a relationship is established, signaling and media streaming that passes through virtual telephony device 28 may then be modified through address translation or media stream manipulation for various reasons before they are sent on to the destination device. Reasons for such modifications include duplicating streams, dynamically redirecting streams, maintaining connections between devices, converting between data formats (e.g., A-Law to μ-Law), and injecting media.

As will be described in the present application, one implementation of virtual telephony device 28 is as a telephony proxy to allow telecommunications between a trusted telephone coupled to a protected network, such as LAN 20, and an untrusted device external to the protected network while still maintaining network security. Through the use of an authentication controller 25, which evaluates incoming communications, the telephony proxy can be used to monitor communications directed to trusted telephones on LAN 20, for example, from untrusted devices outside of LAN 20 (e.g., telephones coupled to LAN 40 or Internet 50). The telephony proxy may also be used to manipulate the media streaming between the trusted telephone and the untrusted device as required to maintain the integrity of the protected network.

In order for a call to be placed through a virtual telephony device, for example a call placed to IP telephone 24a in LAN 20 through virtual telephony device 28, telephone 24a should be registered with virtual telephony device 28. Telephone 24a is instructed by call manager 26 to register with virtual telephony device 28 at a specified IP address and port. Telephone 24a signals virtual telephony device 28 via TCP/IP indicating that it would like to register. If virtual telephony device 28 accepts the registration request, telephone 24a sends a registration message to virtual telephony device 28 using TCP/IP. The registration message typically comprises information about the telephone such as the telephone's IP and media access control (MAC) addresses, the type of telephone, and the codec(s) used by the telephone.

Figure 2:
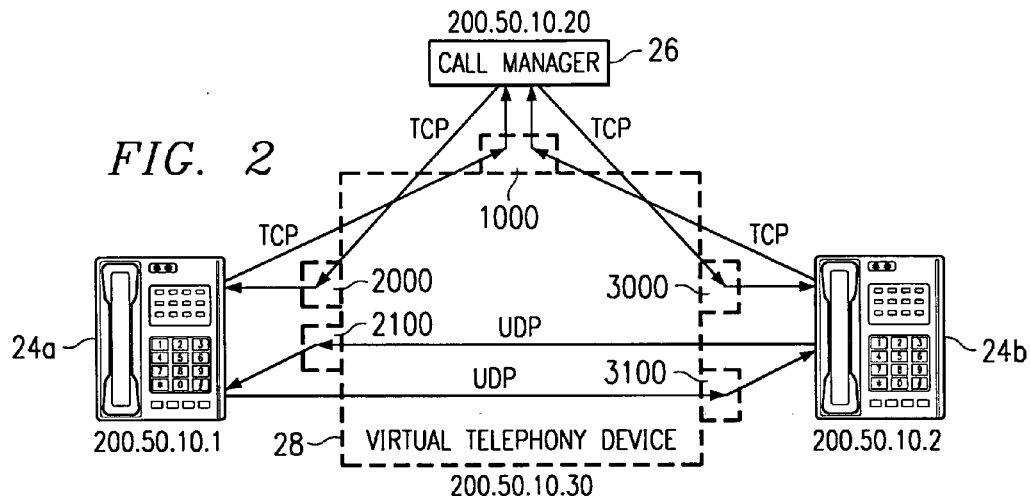
FIG. 2 illustrates an exemplary telecommunication link between network devices using a virtual telephony device in accordance with the present invention.

FIG. 2 illustrates an exemplary communication link created using virtual telephony device 28. The communication link represents any connection or other coupling between two or more telephony devices that allows the telephony devices to communicate in some manner. It should also be noted that although the TCP and UDP protocols are specifically identified in the following discussion, any other suitable signaling and media transmission protocols may be used. Virtual telephony device 28 initiates this communication link by first creating a logical connection to telephone 24a. Creating this logical connection involves associating logical UDP and TCP ports of virtual telephony device 28 with telephone 24a. Virtual telephony device 28 designates a TCP port (for example, port 2000) as the signaling port of telephone 24a and designates a UDP port (for example, port 2100) as the streaming port of telephone 24a. Similarly, when associating logical UDP and TCP ports of virtual telephony device 28 with telephone 24b, virtual telephony device 28 may designate a TCP port (for example, port 3000) as the signaling port of telephone 24b and designate a UDP port (for example, port 3100) as the streaming port of telephone 24b. Virtual telephony device 28 instructs call manager 26 to send all signaling directed to telephone 24a to logical port 2000 of virtual telephony device 28. Likewise, virtual telephony device 28 instructs call manager 26 to send all media streaming directed to telephone 24a from other telephones to logical port 2100 of virtual telephony device 28. Virtual telephony device 28 will automatically forward any data that is subsequently sent to these ports of virtual telephony device 28 to the IP address of telephone 24a (for example 200.50.10.1). As far as call manager 26 is concerned, telephone 24a is located at these logical ports of virtual telephony device 28.

Likewise, virtual telephony device 28 has typically designated a TCP port (for example, port 1000) as the signaling port of call manager 26 (data is typically not streamed to and from call manager 26, so a UDP port is usually not required). Virtual telephony device 28 instructs telephone 24a (as well as any other registered telephones) to send all signaling directed to call manager 26 to logical port 1000 of virtual telephony device 28.

In operation, when a call is placed to telephone 24a by another telephone 24b (which has registered with virtual telephony device 28 in a similar manner as telephone 24a), telephone 24b initially sends a call initiation request to call manager 26 indicating a desire to communicate with telephone 24a. This call initiation request is sent by telephone 24b to port 1000 of the IP address of virtual telephony device 28 (for example, 200.50.10.30). Virtual telephony device 28 then forwards the request to call manager 26. In order to establish the call, call manager 26 sends signaling information to telephone 24a at port 2000 of the IP address of virtual telephony device 28. Virtual telephony device 28 then forwards this signaling to telephone 24a. If telephone 24a accepts the call, call manager 26 establishes audio (and possibly video) streaming between telephones 24a and 24b by signaling telephone 24b (for example, at port 3000) to begin streaming data to port 2100 of virtual telephony device 28, and by signaling phone 24a to begin streaming to port 3100 of virtual telephony device 28. Thus a telecommunication link is established between telephones 24a and 24b using virtual telephony device 28.

When packets are received at port 2100, virtual telephony device 28 examines the packets and notes the source address of the data. This source address is the IP address of telephone 24b, for example 200.50.10.2, and a particular logical port of this IP address. Virtual telephony device 28 then changes the source address and port in the header of the IP packets coming from telephone 24b to the IP address and logical UDP port of virtual telephony device 28 that was associated with telephone 24a when it registered with virtual telephony device 28 (for example, 200.50.10.30, port 3100). This address modification can be performed by an address modification module of virtual telephony device 28. Virtual telephony device 28 then forwards the packets to telephone 24a (this communication may be performed by a transmission module, such as a UDP/IP stack). Since the header of each packet indicates the media streaming originated from port 3100 of virtual telephony device 28, it appears to telephone 24a that telephone 24b is actually located at this address and port.

A similar process is performed when telephone 24a returns media streaming in response to the streaming from telephone 24b. Since it believes that telephone 24b is located at port 3100 of virtual telephony device 28, telephone 24a directs its data streaming to this location. When virtual telephony device 28 receives the IP packets at port 3100 (which it has previously associated with telephone 24b), it first changes the source IP address and port in the packets' header from the actual port and IP address (200.50.10.1) of telephone 24a to port 2100 of the IP address of virtual telephony device 28. Virtual telephony device 28 then forwards the packets to telephone 24b. Since the header of each packet indicates that the media streaming originated from port 2100 of the IP address of virtual telephony device 28, it appears to telephone 24b that telephone 24a is actually located at this address and port. All subsequent data sent between telephones 24a and 24b is similarly passed through and modified by virtual telephony device 28.

Since all data that is sent between two IP telephones may be passed through virtual telephony device 28, virtual telephony device 28 can be used for other purposes in addition to the address translation function described above. For example, virtual telephony device 28 may serve as a telephony proxy to facilitate telecommunications between a "trusted device" located in the same network as the telephony proxy and an "untrusted device" located outside the network. In this case, communications between the trusted device and the untrusted device are routed through the telephony proxy after being authenticated.

For the purposes of this application the term "trusted device" will be used to indicate an IP telephone that is coupled to a protected or trusted IP network(s) being serviced by the telephony proxy, such as telephone 24b on LAN 20. The term "untrusted device" will be used to indicate an IP or non-IP device that is external to the protected IP network(s). The untrusted device may be coupled to an untrusted network, such as telephone 52 on Internet 50. Alternatively, the untrusted device may be a telephone coupled to a trusted network, such as telephone 32 on LAN 30. In this case, the telephone is untrusted to telephony proxy 28, for example, because the trusted network (LAN 30) is coupled to the protected network (LAN 20) using an untrusted network, such as Internet 50.

For simplicity, subsequent discussion will focus on telephony proxy 28, which is a type of virtual telephony device 28, being used to provide security to LAN 20. Therefore, LAN 20 is the protected (and trusted) network and telephones 24 coupled directly to LAN 20 are trusted telephones. However, it should be understood that telephony proxy 28 can be used in conjunction with any other type of network to which security needs to be provided.

Telephony proxy 28 operates like virtual telephony device 28, described in FIG. 2, to facilitate a telephone call between two or more telephones. However, because at least one of the telephones is untrusted when telephony proxy 28 is used, an authentication step is required before a telecommunication link can be established between the telephones. This authentication step is performed by authentication controller 25. Thus, the primary difference between the telephony proxy software and the virtual telephony device software is that the telephony proxy software does not establish a telecommunication link between a trusted device and an untrusted device until authentication controller 25 approves the link.

When a call initiation request is made by an untrusted device to a trusted device (the term "trusted device" being used to indicate the target of a call initiation request before the request is authenticated), authentication controller 25 evaluates this request to determine if a telecommunication link should be established between the trusted device and the untrusted device using telephony proxy 28. Various methods of evaluating the call initiation request, such as an address look-up or a message format analysis, are described below in conjunction with FIG. 3. As with telephony proxy 28, authentication controller 25 may be implemented as software on any device in LAN 20. For example, the authentication software may be located on a dedicated computer, or it may be located on a computer having other purposes such as computer 26 running the call manager software or computer 27 running the telephony proxy software. In one embodiment, the call manager software, the authentication software, and the telephony proxy software may all be running on the same computer.

Figure 3:
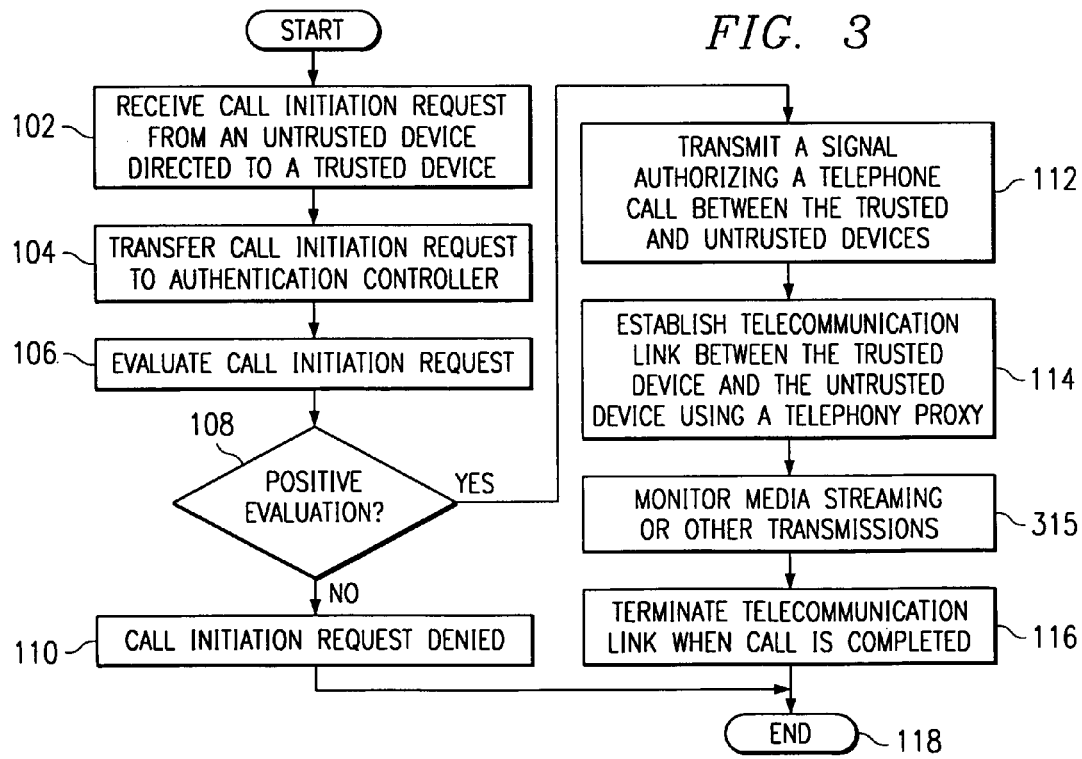
FIG. 3 illustrates an exemplary method for establishing a telephone call between a trusted telephone and an untrusted device in the communication network of FIG. 1.

FIG. 3 illustrates an exemplary method for using a virtual telephony proxy to facilitate a telephone call between a trusted device and an untrusted device. The method begins when a call initiation request is received from an untrusted device at step 102, indicating a desire to place a telephone call to a trusted device. For example, a call initiation request directed to telephone 24a may be generated by telephone 32 on LAN 30, and transmitted over Internet 50 to LAN 20. Alternatively, a call initiation request may be transmitted to LAN 20 from various other untrusted devices using WAN 60, PSTN 80, and/or ISP 90.

The call initiation request may comprise any indication that the untrusted device would like to communicate with a trusted device. LAN 20 may be configured such that all incoming call initiation requests are first directed to telephony proxy 28. Telephony proxy 28 may work in conjunction with or as part of a firewall 29 that is used to screen non-telephony data communications. In this case, incoming call initiation requests and other incoming telephony communications are directed to telephony proxy 28, and all other incoming communications are sent through firewall 29. Alternatively, incoming call initiation requests may be sent to other initial destinations, such as call manager 26 (note that the call manager software may be running on the same computer as the telephony proxy software).

Once the call initiation request has been received, the request is transferred to authentication controller 25 at step 104. As described above, the authentication controller software may be running on the same computer as telephony proxy 28 and/or call manager 26, so this transferring step may simply involve passing the call initiation request between software modules on the same computer. The call initiation request is evaluated by authentication controller 25 at step 106. A variety of evaluations may be performed on the call initiation request to determine whether the request should be accepted and whether a call should be established between the untrusted device and the trusted device.

One such evaluation involves determining whether the trusted device is a proper recipient of a telephone call from an untrusted device. This evaluation may simply involve determining whether the trusted device is actually a telephone or some other telephony device capable of receiving telephone calls. Since IP telephony allows the integration of telephones and other network devices on the same IP network, care must be taken to ensure that unauthorized parties are not able to access secured data or send unwanted data, such as a virus, to the network.

By ensuring that the object of the call initiation request is a telephone or other telephony device, these worries are reduced. There is typically no sensitive data located on an IP telephone that an intruder could access. Furthermore, if a virus is sent to an IP telephone after it is connected with the untrusted device, the IP telephone may simply attempt to "play" the incoming IP packets to the telephone's user. In this case, nothing will happen since the packets are not in a media format, such as an RTP stream. Also, the data in the incoming packets is not stored at the telephone (except for temporary buffering), and it is typically not accessed in a manner that would infect the telephone or the network with a virus or other unwanted data.

One way that authentication controller 25 can determine whether the trusted device is actually a telephone is by comparing the network address of the called device with the addresses on an address list 23 stored in the memory of the computer running the authentication controller software (or in the memory of any other network device). For example, the approved address list may contain the IP addresses of telephones and other telephony devices that are permitted to receive calls from untrusted devices. Alternatively, address list 23 list may contain the IP addresses of untrusted devices that are either authorized to communicate with trusted devices or that are prohibited from communicating with trusted devices. Address list 23 may contain either individual or subnet addresses.

Once authentication controller 25 has evaluated the call initiation request, it determines the appropriate action to take at step 108 based on whether the evaluation was positive or negative. If the evaluation is negative, for example, if the trusted device to which the call is directed is not actually a telephone or other proper recipient of an incoming call, then authentication controller 25 denies the call initiation request at step 110. Once the request is denied, call manager 26 will not attempt to establish a telecommunication link between the untrusted device and the trusted device.

If the evaluation of the call initiation request is positive, then authentication controller 25 transmits a signal to call manager 26 authorizing a telephone call between the trusted device and the untrusted device at step 112. In response to this signal, call manager 26 establishes a telecommunication link between the trusted device and the untrusted device at step 114. This telecommunication link, as described above in conjunction with FIG. 2, may be established such that all telecommunications between the trusted device and the untrusted device are communicated through telephony proxy 28.

Assuming that the trusted device is registered with telephony proxy 28 (as described above), call manager 26 instructs the untrusted device to begin media streaming to the logical port of telephony proxy 28 that has been associated with the trusted device. Additionally, call manager 26 instructs telephony proxy 28 to associate another of its logical ports with the untrusted device. In the manner described above, telephony proxy 28 changes the information in header of the packets incoming from the untrusted device by altering the source address and source port to the address of telephony proxy 28 and the logical port of telephony proxy 28 that was associated with the untrusted device (note that the address may be in the IP header and the port may be in the UDP or TCP header). Telephony proxy 28 then forwards the packets to the trusted device, so that the packets appear to be sent from telephony proxy 28. A similar address translation process is performed on packets being sent from the trusted device to the untrusted device, as described above.

The continuous address translation by telephony proxy 28 ensures that all communications between the trusted device and the untrusted device are controlled by telephony proxy 28. Such continuous control prevents the untrusted device from determining the actual network address of the trusted device.

In one embodiment, telephony proxy 28 also continuously monitors the media streaming between the trusted device and the untrusted device at step 315. For example, telephony proxy 28 can ensure that the media streaming is in a recognized audio encoding format, such as G.711, G.723, or G.729. Telephony proxy 28 can also ensure that the communications between the trusted device and the untrusted device are, in fact, media streaming (or more specifically, RTP media streaming). Furthermore, any other appropriate methods of evaluating the media streaming, including appropriate techniques implemented by data firewalls, may also be used to monitor any unauthorized access to a network. If telephony proxy 28 determines at any point that suspect media streaming or other transmissions are occurring, telephony proxy 28 can manipulate or terminate the data streaming between the untrusted device and the trusted device. Once the telephone call between the trusted device and the untrusted devices is completed (or once suspect transmissions are detected), the telecommunication link is terminated at step 116.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for establishing a telephone call between a trusted Internet Protocol (IP) telephone and an untrusted device, the method comprising:

receiving a call initiation request from an untrusted device external to a trusted network, the call initiation request indicating a desired communication with a trusted IP telephone coupled to the trusted network;

evaluating the call initiation request;

establishing a telecommunication link between the untrusted device and the trusted IP telephone in response to a positive evaluation of the call initiation request, wherein evaluating the call initiation request comprises determining whether the untrusted device is requesting the establishment of media streaming with the trusted IP telephone;

monitoring communications transmitted between the untrusted device and the trusted IP telephone on the telecommunication link to ensure that the communications are media streaming to maintain the integrity of the trusted network; and terminating the telecommunication link if the communications transmitted between the untrusted device and the trusted IP telephone are not media streaming to maintain the integrity of the trusted network;

wherein establishing the telecommunication link comprises:

associating a first logical port of a telephony proxy with the trusted IP telephone;

associating a second logical port of the telephony proxy with the untrusted device;

receiving first telecommunication data from the untrusted device at the first logical port;

modifying a first source address information in the first telecommunication data to specify the second logical port of the telephony proxy;

communicating the first telecommunication data with the modified first source address information to the trusted IP telephone;

receiving second telecommunication data from the trusted IP telephone at the second logical port;

modifying a second source address information in the second telecommunication data to specify the first logical port of the telephony proxy; and communicating the second telecommunication data with the modified second source address information to the untrusted device.

2. A method for establishing a telephone call between a trusted Internet Protocol (IP) telephone and an untrusted device, the method comprising:

receiving a call initiation request from an untrusted device external to a trusted network, the call initiation request indicating a desired communication with a trusted IP telephone coupled to the trusted network;

evaluating the call initiation request;
establishing a telecommunication link between the untrusted device and the trusted IP telephone in response to a positive evaluation of the call initiation request;
monitoring communications transmitted between the untrusted device and the trusted IP telephone on the telecommunication link to ensure that the communications are media streaming to maintain the integrity of the trusted network; and
terminating the telecommunication link if the communications transmitted between the untrusted device and the trusted IP telephone are not media streaming to maintain the integrity of the trusted network;
wherein evaluating the call initiation request comprises determining whether the untrusted device is requesting the establishment of media streaming with the trusted IP telephone.

3. The method of claim 2, wherein receiving a call initiation request from the untrusted device comprises intercepting a call initiation request at an entry point to the trusted network servicing the trusted IP telephone, the call initiation request sent from outside the trusted network by the untrusted device.

4. The method of claim 2, wherein evaluating the call initiation request comprises determining whether the trusted IP telephone is a proper recipient of a telephone call from an untrusted device.

5. The method of claim 4, wherein determining whether the trusted IP telephone is a proper recipient of a telephone call from an untrusted device comprises determining whether a network address of the trusted IP telephone is included in a list of approved network addresses.

6. The method of claim 2, wherein evaluating the call initiation request comprises determining whether a network address of the untrusted device is included in a list of approved network addresses.

7. The method of claim 2, wherein establishing a telecommunication link between the untrusted device and the trusted IP telephone comprises establishing a telecommunication link using a telephony proxy, whereby all telecommunications between the trusted IP telephone and the untrusted device are communicated through the telephony proxy.

8. The method of claim 7, further comprising monitoring the telecommunication link to determine whether the telecommunications being sent by the untrusted device use an appropriate audio format.

9. The method of claim 7, wherein monitoring the communications transmitted between the untrusted device and the trusted IP telephone comprises monitoring the telecommunication link to determine whether the telecommunications being sent by the untrusted device comprise media streaming.

10. The method of claim 7, wherein establishing a telecommunication link between the untrusted device and the trusted IP telephone using the telephony proxy comprises:
associating a first logical port of the telephony proxy with the trusted IP telephone;
receiving telecommunication data from the untrusted device at the first logical port;
modifying source address information in the received telecommunication data to specify a second logical port of the telephony proxy associated with the untrusted device; and
communicating the telecommunication data with the modified source address information to the trusted IP telephone.

11. The method of claim 10, wherein associating a first logical port of the telephony proxy with the untrusted device comprises associating a User Datagram Protocol (UDP) logical port to enable the streaming of IP packets.

12. The method of claim 11, wherein modifying the source address information in the received telecommunication data comprises modifying a source IP address and a source port in a header of each IP packet.

13. A communication network for establishing a telephone call between a trusted telephone and an untrusted device, the communication network comprising:
a first trusted network;
a trusted telephone coupled to the first trusted network;
an authentication controller coupled to the first trusted network and operable to evaluate a call initiation request received from an untrusted device external to the first trusted network, the call initiation request indicating a desired communication with the trusted telephone, wherein evaluating the call initiation request comprises determining whether the untrusted device is requesting the establishment of media streaming with the trusted telephone; and
a call manager operable to initiate the creation of a telecommunication link between the trusted telephone and the untrusted device in response to a positive evaluation of the call initiation request;
wherein the authentication controller is further operable to:
monitor communications transmitted between the untrusted device and the trusted telephone on the telecommunication link to ensure that the communications are media streaming to maintain the integrity of the trusted network; and
terminate the telecommunication link if the communications transmitted between the untrusted device and the trusted telephone are not media streaming to maintain the integrity of the trusted network.

14. The communication network of claim 13, wherein the call manager is further operable to initiate the creation of a telecommunication link between the trusted telephone and the untrusted device using a telephony proxy, whereby all telecommunications between the trusted telephone and the untrusted device are communicated through the telephony proxy.

15. The communication network of claim 14, wherein the telephony proxy, the authentication controller, and the call manager comprise software executed on one or more devices in the first trusted network.

16. The communication network of claim 13, wherein the authentication controller is a component of the call manager.

17. The communication network of claim 13, wherein:
the first trusted network comprises an Internet Protocol (IP) network; and
the trusted telephone comprises an IP telephone.

18. The communication network of claim 13, wherein the first trusted network and the untrusted device are coupled to the Internet.

19. The communication network of claim 13, wherein:
the first trusted network is coupled to the Public Switched Telephone Network (PSTN) using a gateway; and
the untrusted device is coupled to the PSTN.

20. The communication network of claim 13, further comprising:

a second trusted network, the untrusted device coupled to the second trusted network; and
an untrusted network coupling the first trusted network to the second trusted network.

21. The communication network of claim 13, wherein the authentication controller comprises a list of addresses of network devices permitted to receive telephone calls from untrusted devices, the authentication controller evaluating a call initiation request positively if the call initiation request indicates a desired communication with a network device having an address in the list of network addresses.

22. The communication network of claim 13, wherein the authentication controller comprises a list of network addresses of untrusted devices permitted to communicate with the trusted telephone, the authentication controller evaluating a call initiation request positively if the call initiation request originates from an untrusted device having an address on the list of network addresses.

23. The communication network of claim 13, wherein the authentication controller is further operable to monitor the telecommunication link between the trusted telephone and the untrusted device to determine whether telecommunications being sent by the untrusted device use an appropriate audio format.

24. The communication network of claim 13, wherein the authentication controller is further operable to monitor the communications transmitted between the untrusted device and the trusted telephone to determine whether telecommunications being sent by the untrusted device comprise media streaming.

25. Software embodied in a computer-readable medium and operable to perform the following steps:
receiving a call initiation request from an untrusted device external to a trusted network, the call initiation request indicating a desired communication with a trusted Internet Protocol (IP) telephone coupled to the trusted network;
evaluating the call initiation request;
establishing a telecommunication link between the untrusted device and the trusted IP telephone in response to a positive evaluation of the call initiation request;
monitoring communications transmitted between the untrusted device and the trusted IP telephone on the telecommunication link to ensure that the communications are media streaming to maintain the integrity of the trusted network; and
terminating the telecommunication link if the communications transmitted between the untrusted device and the trusted IP telephone are not media streaming to maintain the integrity of the trusted network;
wherein evaluating the call initiation request comprises determining whether the untrusted device is requesting the establishment of media streaming with the trusted IP telephone.

26. The software of claim 25, wherein receiving a call initiation request from the untrusted device comprises intercepting a call initiation request at an entry point to the trusted network servicing the trusted IP telephone, the call initiation request sent from outside the trusted network by the untrusted device.

27. The software of claim 25, wherein evaluating the call initiation request comprises determining whether the trusted IP telephone is a proper recipient of a telephone call from an untrusted device.

28. The software of claim 27, wherein determining whether the trusted IP telephone is a proper recipient of a telephone call from an untrusted device comprises determining whether a network address of the trusted IP telephone is included in a list of approved network addresses.

29. The software of claim 25, wherein evaluating the call initiation request comprises determining whether a network address of the untrusted device is included in a list of approved network addresses.

30. The software of claim 25, wherein establishing a telecommunication link between the untrusted device and the trusted IP telephone comprises establishing a telecommunication link using a telephony proxy, whereby all telecommunications between the trusted IP telephone and the untrusted device are communicated through the telephony proxy.

31. The software of claim 30, further operable to monitor the telecommunication link to determine whether the telecommunications being sent by the untrusted device use an appropriate audio format.

32. The software of claim 30, further operable to monitor the telecommunication link to determine whether the telecommunications being sent by the untrusted device comprise media streaming.

33. The software of claim 30, wherein establishing a telecommunication link between the untrusted device and the trusted IP telephone using the telephony proxy comprises:
associating a first logical port of the telephony proxy with the trusted IP telephone;
receiving telecommunication data from the untrusted device at the first logical port;
modifying source address information in the received telecommunication data to specify a second logical port of the telephony proxy associated with the untrusted device; and
communicating the telecommunication data with the modified source address information to the trusted IP telephone.

34. The software of claim 33, wherein associating a first logical port of the telephony proxy with the untrusted device comprises associating a User Datagram Protocol (UDP) logical port to enable the streaming of IP packets.

35. The software of claim 34, wherein modifying the source address information in the received telecommunication data comprises modifying a source IP address and a source port in a header of each IP packet.

36. An apparatus for establishing a telephone call between a trusted Internet Protocol (IP) telephone and an untrusted device, the apparatus comprising:
an authentication controller operable to evaluate a call initiation request received from an untrusted device external to a trusted network, the call initiation request indicating a desired communication with a trusted IP telephone coupled to the trusted network, wherein evaluating the call initiation request comprises determining whether the untrusted device is requesting the establishment of media streaming with the trusted IP telephone;
a call manager operable to:
initiate the creation of a telecommunication link between the trusted IP telephone and the untrusted device in response to a positive evaluation of the call initiation request;
monitor communications transmitted between the untrusted device and the trusted IP telephone on the telecommunication link to ensure that the communications are media streaming to maintain the integrity of the trusted network; and terminate the telecommunication link if the communications transmitted between the untrusted device and the trusted IP telephone are not media streaming to maintain the integrity of the trusted network; and a telephony proxy, the telecommunication link between the trusted IP telephone and the untrusted device created using the telephony proxy such that all telecommunications between the trusted IP telephone and the untrusted device are communicated through the telephony proxy.

37. The apparatus of claim 36, wherein the authentication controller comprises a list of addresses of network devices permitted to receive telephone calls from untrusted devices, the authentication controller evaluating a call initiation request positively if the call initiation request indicates a desired communication with a network device having an address in the list of network addresses.

38. The apparatus of claim 36, wherein the authentication controller comprises a list of network addresses of untrusted devices permitted to communicate with the trusted IP telephone, the authentication controller evaluating a call initiation request positively if the call initiation request originates from an untrusted device having an address on the list of network addresses.

39. The apparatus of claim 36, wherein the authentication controller is further operable to monitor the telecommunication link between the trusted IP telephone and the untrusted device to determine whether telecommunications being sent by the untrusted device use an appropriate audio format.

40. The apparatus of claim 36, wherein the authentication controller is further operable to monitor the telecommunication link between the trusted IP telephone and the untrusted device to determine whether telecommunications being sent by the untrusted device comprise media streaming.

41. The apparatus of claim 36, wherein the telephony proxy comprises:

a first logical port associated with the trusted IP telephone;

a second logical port associated with the untrusted device;

an address modification module operable to modify source address information in telecommunication data received at the first logical port from the untrusted device to specify the second logical port of the telephony proxy; and a transmission module operable to communicate the telecommunication data with the modified source address information to the trusted IP telephone.

42. The apparatus of claim 41, wherein the first and second logical ports are User Datagram Protocol (UDP) logical ports.

43. The apparatus of claim 41, wherein the address modification module is operable to modify a source IP address and port information in a header of an IP packet.

* * * * *